(12) United States Patent
Cantrell et al.

(10) Patent No.: US 10,296,005 B2
(45) Date of Patent: May 21, 2019

(54) APPARATUS AND METHOD FOR MONITORING A FIELD

(71) Applicant: Walmart Apollo, LLC, Bentonville, AR (US)

(72) Inventors: Robert L. Cantrell, Herndon, VA (US); John P. Thompson, Bentonville, AR (US); David C. Winkle, Bella Vista, AR (US); Michael D. Atchley, Springdale, AR (US); Donald R. High, Noel, MO (US); Todd D. Mattingly, Bentonville, AR (US); John J. O'Brien, Farmington, AR (US); John F. Simon, Pembroke Pines, FL (US); Nathan G. Jones, Bentonville, AR (US); Robert C. Taylor, Charlotte, NC (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/697,293

(22) Filed: Sep. 6, 2017

(65) Prior Publication Data
US 2018/0074499 A1 Mar. 15, 2018

Related U.S. Application Data

(60) Provisional application No. 62/385,827, filed on Sep. 9, 2016.

(51) Int. Cl.
*G05D 1/00* (2006.01)
*B64C 39/02* (2006.01)

(52) U.S. Cl.
CPC ......... *G05D 1/0088* (2013.01); *B64C 39/024* (2013.01); *G05D 1/0094* (2013.01); *B64C 2201/127* (2013.01)

(58) Field of Classification Search
CPC ............ G05D 1/0088; H04Q 2209/40; H04Q 2209/50; H04Q 2209/80
See application file for complete search history.

(56) References Cited

U.S. PATENT DOCUMENTS

| 7,610,122 B2 | 10/2009 | Anderson |
| 8,849,523 B1 | 9/2014 | Chan |

(Continued)

FOREIGN PATENT DOCUMENTS

| AU | 2013245429 | 6/2014 |
| CA | 2934082 | 7/2015 |

OTHER PUBLICATIONS

PCT; International Search Report and Written Opinion dated Nov. 28, 2017.

*Primary Examiner* — Anshul Sood
(74) *Attorney, Agent, or Firm* — Fitch, Even, Tabin & Flannery LLP

(57) ABSTRACT

Systems, apparatuses, and methods are provided herein for field monitoring. A system for field monitoring comprises a plurality of types of sensor modules, an unmanned vehicle comprising a sensor system, and a control circuit configured to: receive onboard sensor data from the sensor system of the unmanned vehicle, detect an alert condition at a monitored area based on the onboard sensor data, select one or more types of sensor modules from the plurality of types of sensor modules to deploy at the monitored area based on the onboard sensor data, and cause the unmanned vehicle and/or one or more other unmanned vehicles to transport one or more sensor modules of the one or more types of sensor modules to the monitored area and deploy the one or more sensor modules by detaching from the one or more sensor modules at the monitored area.

21 Claims, 5 Drawing Sheets

(56) References Cited

U.S. PATENT DOCUMENTS

| | | | |
|---|---|---|---|
| 9,251,698 B2 | 2/2016 | Vian | |
| 9,550,577 B1 | 1/2017 | Beckman | |
| 9,573,684 B2 | 2/2017 | Kimchi | |
| 2005/0206506 A1* | 9/2005 | Kulesz | G08B 21/12 340/286.02 |
| 2013/0068892 A1 | 3/2013 | Bin Desa | |
| 2014/0024313 A1 | 1/2014 | Campbell | |
| 2014/0263822 A1 | 9/2014 | Malveaux | |
| 2015/0070188 A1 | 3/2015 | Aramburu | |
| 2015/0120094 A1 | 4/2015 | Kimchi | |
| 2015/0205298 A1 | 7/2015 | Stoschek | |
| 2015/0277440 A1 | 10/2015 | Kimchi | |
| 2015/0334768 A1 | 11/2015 | Ranasinghe | |
| 2016/0063642 A1 | 3/2016 | Luciani | |
| 2016/0196755 A1 | 7/2016 | Navot | |
| 2016/0257401 A1 | 9/2016 | Buchmueller | |
| 2017/0110017 A1 | 4/2017 | Kimchi | |
| 2017/0363504 A1* | 12/2017 | Winant | G01M 5/0066 |

\* cited by examiner

APPARATUS AND METHOD FOR MONITORING A FIELD

CROSS-REFERENCE TO RELATED APPLICATION

This application claims the benefit of the U.S. Provisional Application No. 62/385,827 filed Sep. 9, 2016, which is incorporated herein by reference in its entirety.

TECHNICAL FIELD

This invention relates generally to unmanned vehicles.

BACKGROUND

An unmanned vehicle generally refers to a motored vehicle without a human driver or pilot aboard.

BRIEF DESCRIPTION OF THE DRAWINGS

Disclosed herein are embodiments of apparatuses and methods for field monitoring. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for field monitoring. In some embodiments, a system for field monitoring comprises a plurality of types of sensor modules, an unmanned vehicle comprising a sensor system, and a control circuit configured to: receive onboard sensor data from the sensor system of the unmanned vehicle, detect an alert condition at a monitored area based on the onboard sensor data, select one or more types of sensor modules from the plurality of types of sensor modules to deploy at the monitored area based on the onboard sensor data, and cause the unmanned vehicle and/or one or more other unmanned vehicles to transport one or more sensor modules of the one or more types of sensor modules to the monitored area and deploy the one or more sensor modules by detaching from the one or more sensor modules at the monitored area.

Figure 1:
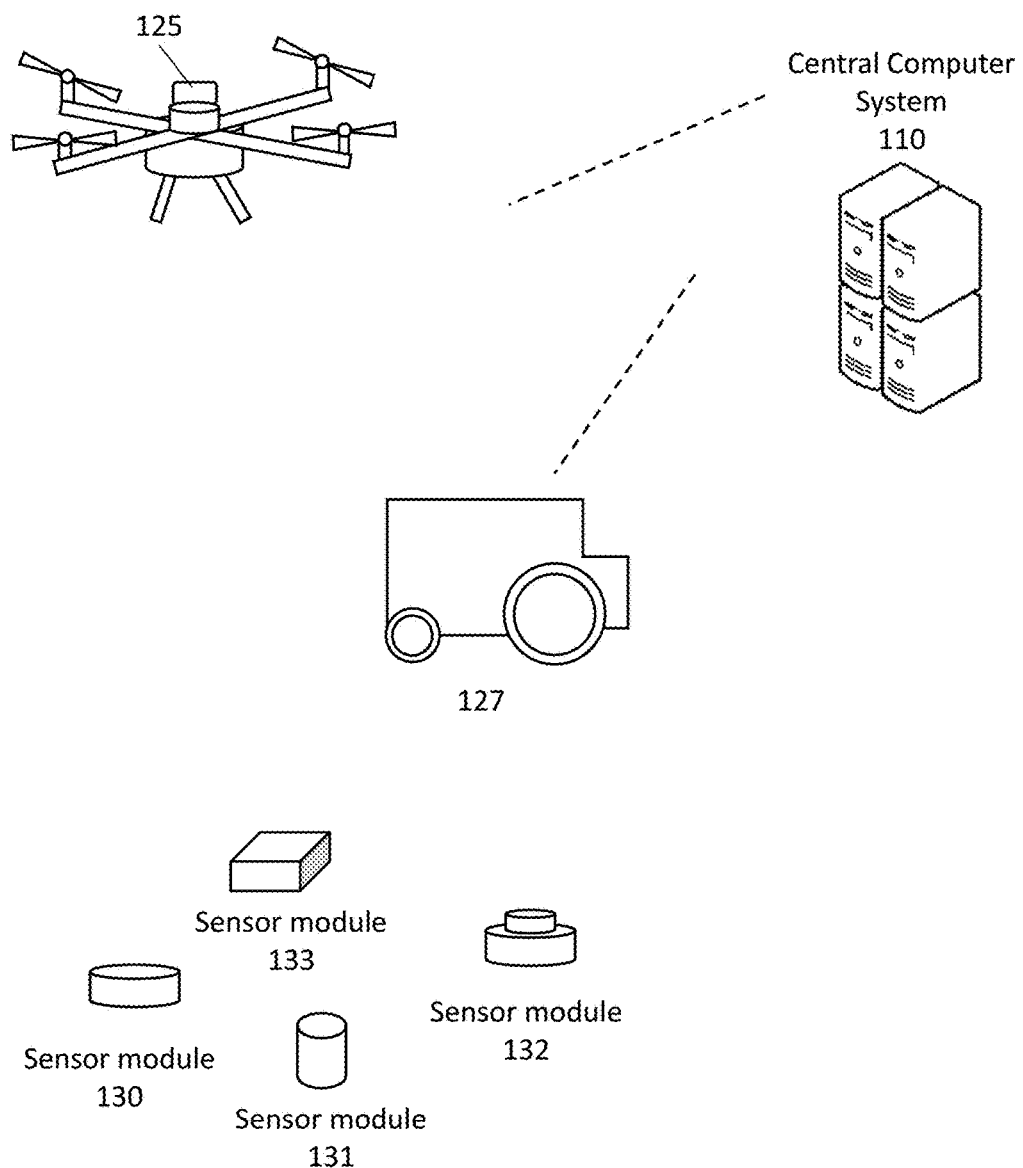
FIG. 1 is a system diagram of a system in accordance with several embodiments.

Referring now to FIG. 1, a system for monitoring a field with an unmanned vehicle according to some embodiments is shown. The system includes a central computer system 110, an unmanned aerial vehicle (UAV) 125, an unmanned ground vehicle (UGV) 127, and a plurality of sensor modules 130, 131, 132, and 133.

The central computer system 110 may comprise a control circuit, a central processing unit, a processor, a microprocessor, and the like and may be one or more of a server, a central computing system, an unmanned vehicle management computer system, a personal computer system, and the like. Generally, the central computer system 110 may comprise any processor-based device configured to communicate with UAVs. In some embodiments, the central computer system 110 may comprise a system that is remote to a monitored area, a system that is at least partially located at the monitored area, and/or a cloud-based system. The central computer system 110 may comprise a processor configured to execute computer readable instructions stored on a computer readable storage memory. The central computer system 110 may generally be configured to provide task instructions to the UAV 125 and/or the UGV 127. In some embodiments, the central computer system 110 may be configured to detect alert conditions and select sensor modules to deploy based on the alert conditions. In some embodiments, the central computer system 110 may further be configured to instruct one or more unmanned vehicles to transport the selected sensor modules to the monitored area. In some embodiments, the central computer system 110 may perform one or more steps in the methods and processes described with reference to FIG. 2 herein. Further details of a central computer system 110 according to some embodiment is provided with reference to FIG. 3 herein.

The UAV 125 may generally comprise an unmanned aerial system configured to perform one or more tasks. In some embodiments, the UAV 125 may comprise a fixed plane airplane and/or a multicopter configured to hover at and/or near a task premises. In some embodiments, the UAV 125 may comprise a quadcopter, or hexacopter, octocopter, etc. In some embodiments, the UAV 125 may comprise an air chamber (e.g. balloon, blimp, etc.) storing lighter than air gas for providing lift to the UAV 125. In some embodiments, the UAV 125 may comprise flexible wings configured to allow the unmanned UAV 125 to glide in the air. The UGV 127 may generally comprise an unmanned ground system comprising configured to perform one or more task. In some embodiments, the UGV may comprise one or more wheels and/or other types of locomotion system for traveling on the ground.

The UAV 125 and/or the UGV 127 may generally be referred to as unmanned vehicles. In some embodiments, the UAV 125 and/or the UGV 127 may comprise a communication device configured to communicate with the central computer system 110, a GPS receiver configured to provide geolocation information of the unmanned vehicle, a control circuit configured to control the navigation and task performance of the unmanned vehicle, and a coupler configured to attached to and release one or more of the sensor modules 130-133. In some embodiments, the unmanned vehicle may further be configured to retrieve a previously deployed sensor.

The UAV 125 and/or the UGV 127 may comprise an onboard sensor system for capturing data from the environment of the unmanned vehicle. In some embodiments, the sensor system may comprise one or more environmental sensors such as wind sensor, light sensor, image sensor, visibility sensor, weather sensor, barometric pressure sensor, range sensor, humidity sensor, sound sensor, thermal image sensor, night vision camera, soil sensor, etc. In some embodiments, one or more sensor may be configured to collect data while the unmanned vehicle is traveling and/or stationary. In some embodiments, the UAV 125 may be configured to land to use one or more of its onboard sensors. In some embodiments, the sensor system may further be configured to collect data specified by one or more tasks assigned to the unmanned vehicle. In some embodiments, the unmanned vehicle may include other travel sensors such as optical sensors and radars for detecting obstacles in the path of travel to avoid collisions. In some embodiments, the sensor system may comprise one or more detachable modular components comprising one or more sensors. For example, one or more sensor modules 130-133 may be configured to also collect data while being carried by an unmanned vehicle. In some embodiments, the sensor system may comprise one or more devices attached to the unmanned vehicle's body through one or more attachment means and/or may be integrated with the body of the unmanned vehicle. In some embodiments, one or more sensors may be coupled to an actuator that pivots and/or rotates the sensor relative to the body of the unmanned vehicle. In some embodiments, sensors of the sensor system may be located on different portions of the unmanned vehicle (e.g. top, sides, wing, landing gear, etc.).

In some embodiments, the unmanned vehicle may be configured to perform one or more types of task. In some embodiments, the tasks may relate to one or more of agriculture, farming, livestock management, geological survey, scientific study, wildlife study, wildlife management, security surveillance, forestry, marine study, etc. In some embodiments, tasks may comprise data gathering tasks and/or action tasks in which unmanned vehicle acts to affect the environment, animals, and/or persons around it. In some embodiments, tasks may be performed with one or more modular attachments of the unmanned vehicle. In some embodiments, two or more unmanned vehicles may be configured to collectively perform a task. Further details of an unmanned vehicle according to some embodiments is provided with reference to FIG. 3 herein.

While a UAV 125 and a UGV 127 are shown in FIG. 1, in some embodiments, the central computer system 110 may communicate with and/or provide task instructions to a plurality of different types of unmanned vehicles. In some embodiments, the system may only comprise UAVs or UGVs. In some embodiments, UAVs and UGVs in a system may be configured to perform different types of task, carry different types of sensors, and/or service different types of locations. In some embodiments, two or more unmanned vehicles may be deployed at a task site to perform complimentary and/or parallel tasks simultaneously and/or in shifts. For example, UAVs 125 may be assigned to collect soil samples and/or deploy sensor modules in areas inaccessible to UGVs 127 or could potentially be damaged by UGVs 127. In some embodiments, UAVs 125 may be configured to transfer soil samples and/or sensor modules between the deployment locations and UGVs 127. For example, when a UAV 125 uses a soil sampler to collect soil samplers, the UAV 125 may deposit collected samples at a UGV 127 between collections to reduce its carrying weight. In some embodiments, UGVs 127 may function as landing pads, charging stations, docking stations, and storage locations, for one or more UAVs 125.

In some embodiments, the unmanned vehicles may be configured to communicate directly with each other and/or via a docking station or other communication devices in the field. In some embodiments, central computer system 110 may assign tasks to unmanned vehicles based on one or more of the locations of unmanned vehicles, locations of task targets, other tasks already assigned to unmanned vehicles, capabilities of each unmanned vehicle, fuel level of each unmanned vehicle, current attachments of each unmanned vehicle, etc.

The sensor modules 130-133 may comprise sensors configured to be deployed into the field. In some embodiments, the sensor modules 130-133 in the system may comprise a plurality of types of sensors such as one or more of an optical sensor, a camera, a soil sensor, a sonic detector, a wind sensor, a moisture sensor, a temperature sensor, a chemical detector, an airborne chemical sensor, a pollen sensor, a passive sensor, a color-changing sensor, a radon sensor, a lead sensor, a bacteria sensor, a pollen counter, a biodegradable sensor, and a litmus paper. In some embodiments, a soil sensor may comprise one or more probes configured to detect for soil content when inserted into the soil. In some embodiments, a soil sensor may comprise a soil sampler configured to collect soil samples and be retrieved by an unmanned vehicle. In some embodiments, the collected soil sample may be analyzed by a sensor on the unmanned vehicle and/or may be transfer to a collection location (e.g. laboratory, command station, etc.) for cataloging and further analysis. In some embodiments, a sensor module may comprise a coupler for coupling to an unmanned vehicle. In some embodiments, a sensor module may further comprise an anchor for anchoring to a deployed location such as one or more of the ground, a plant, a tree, a building, a structure, a container, and a vehicle. In some embodiments, a sensor module may be configured to communicate directly with unmanned vehicles via a wireless communication device. In some embodiments, a sensor module may be configured to transmit sensor readings to communication stations and/or the central computer system 110. In some embodiments, the sensor module may comprise an indicator that may be detected by the unmanned vehicle. For example, a sensor module may comprise a color changing portion that responses to environmental conditions such as temperature, moisture, airborne chemical, soil pH, etc. In some embodiments, the data collected by the sensor modules 130-133 may be used by the central computer system 110 and/or an unmanned vehicle to further understand an alert condition. In some embodiments, data collected by the sensor modules 130-133 may be used to determine a redress action for the alert condition. In some embodiments, data collected by the sensor modules 130-133 may be used determine an adjustment to the deployed sensor modules for further monitoring. In some embodiments, a sensor module may further comprise a power source such as one or more of a battery and a solar cell.

In some embodiments, the system may further comprise communication stations in the field that are configured to wirelessly relays information between one or more of the central computer system 110, unmanned vehicles, and sensor modules 130-133. In some embodiments, a communication station may comprise a control circuit, a long range transceiver, and/or short-range data transceiver. In some embodiments, a plurality of communication stations may collectively form an area wireless network for various components of the system to exchange information. In some embodiments, one or more communication stations may comprise a radio frequency tower in the field. In some embodiments, one or more communication stations may comprise unmanned vehicles and/or balloons. In some embodiments, a deployed sensor module may be docked to a communication station.

Figure 2:
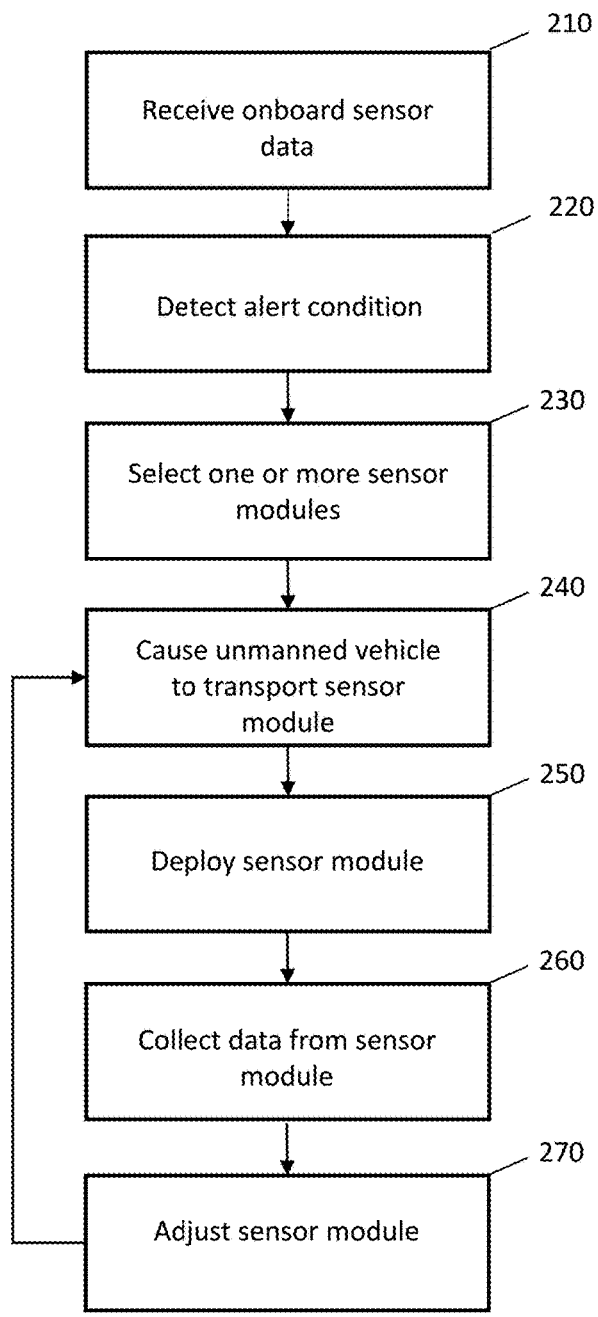
FIG. 2 is a flow diagram of a method in accordance with several embodiments.

Referring now to FIG. 2, a method of monitoring a field is shown. In some embodiments, the steps shown in FIG. 2 may be performed by a processor-based device, such as one or more of the central computer system 110, the control unit of the UAV 125, and the control unit of the UGV 127 described with reference to FIG. 1, and the control circuit 314 and/or the control circuit 321 described with reference to FIG. 3 below. In some embodiments, the steps may be performed by one or more of a processor of an unmanned vehicle, a processor of a central computer system, a processor of a docking station, and/or a processor device on the ground of the unmanned vehicle task site.

In some embodiments, prior to step 210, the system may instruct an unmanned vehicle to go out and perform a task in the field. The unmanned vehicle may be configured to collect data from its surrounding as it travels to a destination and/or carry out a task. In some embodiments, the data may be collected by the unmanned vehicle's onboard sensors.

In step 210, the system receives onboard sensor data from the sensor system of an unmanned vehicle. In some embodiments, prior to step 210, the system may instruct an unmanned vehicle to go out and perform a task in the field. The unmanned vehicle may be configured to collect data from its surrounding with the onboard system sensor as it travels to a destination and/or carry out a task. In some embodiments, the sensor system may comprise one or more environmental sensors such as wind sensor, light sensor, image sensor, visibility sensor, weather sensor, barometric pressure sensor, range sensor, humidity sensor, sound sensor, thermal image sensor, night vision camera, soil sensor, etc. In some embodiments, the onboard sensor system may comprise the unmanned vehicle's navigation sensors. In some embodiments, a soil sensor may comprise a probe configured to detect for soil content when inserted into the soil. In some embodiments, a soil sensor may comprise a soil sampler and the unmanned vehicle may be configured to use the soil sampler to the collect soil samples. In some embodiments, the collected soil sample may be analyzed by a sensor on the unmanned vehicle and/or may be transferred to a collection location (e.g. laboratory, command station, etc.) for cataloging and further analysis.

In step 220, the system detects an alert condition at a monitored area. In some embodiments, the alert condition may be detected based on the onboard sensor data collected in step 210. In some embodiments, the alert condition may be detected based on onboard sensor data collected by a plurality of unmanned vehicles and/or stationary sensors in the monitored area. In some embodiments, the sensor data may comprise images of the unmanned vehicle's surrounding and the system may perform image recognition to detect for alert conditions. In some embodiments, the sensor data may comprise data collected by one or more of: optical sensors, sound sensors, airborne chemical sensors, wind sensor, light sensor, humidity sensor, thermal image sensor, night vision camera, soil sensor, etc. In some embodiments, an alert condition may be detected if on one or more measurements in the area falls out of an expected range (e.g. too dry, too loud, etc.). In some embodiments, the system may comprise a baseline model for one or more area of the monitored area. An alert condition may be detected if the detected one or more conditions substantially deviated from the baseline model. In some embodiments, an alert condition may comprise conditions such as one or more of flood, fire, plants decay or death, invasive plant, weed, abnormal soil color, insect infestation, insect or animal nest, animal tracks, animal droppings, human presence, etc. Generally, an alert condition may comprise any condition in the monitored area that would require a remedial action and/or further investigation.

In step 230, the system selects one or more types of sensor modules to deploy. In some embodiments, the types of sensor modules may be selected based on the onboard sensor data collected in step 210 and/or the alert condition determined based on the sensor data in step 220. In some embodiments, sensor modules may be selected from sensor types comprising one or more of: an optical sensor, a camera, a soil sensor, a sonic detector, a wind sensor, a moisture sensor, a temperature sensor, a chemical detector, an airborne chemical sensor, a pollen sensor, a passive sensor, a color-changing sensor, a radon sensor, a lead sensor, a bacteria sensor, a pollen counter, a biodegradable sensor, and a litmus paper. In some embodiments, the sensor module may comprise any type of sensor appropriate for the task of the unmanned vehicle. In some embodiments, a sensor module may comprise two or more different types of sensors. In some embodiments, one or more types of sensor modules may be associated with each type of alert condition. For example, for plant decay condition, the system may be configured to select soil sensors. In another example, if possible pests are detected, the system may be configured to select sound and optical sensors. In yet another example, if a possible chemical spill is detected, the system may select soil and/or airborne chemical sensors.

In some embodiments, in step 230, the system may further be configured to determine deployment locations of the one or more sensor modules in the monitored area. In some embodiments, the system may estimate a source of the alert condition and select a plurality of locations to form an array around the estimated source location. In some embodiments, the system may select deployment locations based on the properties of various locations in the monitored area (e.g. surface type, elevation, visibility, etc.) and the sensor type (s). In some embodiments, deployment locations may comprise one or more of the ground, a plant, a tree, a building, a structure, a container, and a vehicle.

In step 240, the system causes an unmanned vehicle to transport the selected sensor module(s) to the monitored area. In some embodiments, sensor modules may be transported by an unmanned vehicle that detected the alert condition in steps 210 and 220 and/or one or more other unmanned vehicles. In some embodiments, the system may instruct an unmanned vehicle already carrying selected types of sensors to travel to the monitored area. In some embodiments, the system may instruct one or more unmanned vehicles to first retrieve one or more sensor modules from a sensor module storage location and/or the field. In some embodiments, the system may determine a route for the unmanned vehicle to deploy one or more sensor modules at specified locations. In some embodiments, an unmanned vehicle may carry sensor modules out to the monitored area and use onboard sensors to select deployment locations for one or more sensors modules. For example, the unmanned vehicle may look for areas with sufficient ground clearance to deploy sensor modules.

In step 250, the unmanned vehicle deploys the sensor modules. In some embodiments, the unmanned vehicle may comprise a coupling mechanism for attaching to one or more sensor modules for transport. In some embodiments, the coupling mechanism may comprise a clamp, a latch, a mechanical arm, a dispenser, an aerial crane, a magnet, and the like. In some embodiments, the coupling mechanism may be configured to propel a sensor module away from the unmanned vehicle for deployment. In some embodiments, a UAV may be configured to land to deploy the sensor module. In some embodiments, a sensor module deployed by a UAV in flight may comprise devices for reducing the force of impact from the drop, such as a parachute. In some embodiments, the unmanned vehicle may further be configured to secure the sensor to the deployment location. For example, the unmanned vehicle may be configured to push the sensor modules into the soil, hang sensor modules on tree branches, secure a sensor to a structure with adhesive, etc. In some embodiments, a deployed sensor module may be configured to remain stationary and collect data at the deployment location. In some embodiments, a deployed sensor module may move with the object (e.g. a tree branch, a vehicle) it is attached to, In some embodiments, one or more unmanned vehicles may be configured to repeat step 250 to install a plurality of stationary sensor modules around the monitored area.

In step 260, the system collects data from the deployed sensor modules. In some embodiments, the sensor module data may comprise one or more of image data, soil content measurement, moisture measurement, wind speed measurement, wind direction measurement, temperature measurement, rainfall measurement, chemical presence measurement, chemical concentration measurement, pollen count, light exposure measurement, etc. In some embodiments, the sensor module data collected over time by one or more sensor modules deployed in the field may be aggregated the system. In some embodiments, the data may be communicated from the sensor to an unmanned vehicle and/or a central computer system via wireless communication. In some embodiments, one or more sensor modules may comprise a visual indicator and an unmanned vehicle may be configured capture an image of the sensor to obtain the sensor data.

In some embodiments, the data collected by the sensor modules and/or the sensor system onboard the unmanned vehicle may be used by the unmanned vehicle to determine a remedial task to address the alert condition. For example, if a chemical analysis of a soil sample detects a deficiency, the unmanned vehicle may be configured to carry out the remedial task of applying a treatment (e.g. chemical, fertilizer, fungicide, etc.) to alleviate the detected soil deficiency. In some embodiments, the unmanned vehicle may be configured first travel to a treatment storage location to retrieve the selected treatment. In some embodiments, the unmanned vehicle may be configured generate an order for a shipment of the curative treatment. In some embodiments, the unmanned vehicle and/or the central computer system may be assigned the remedial task to one or more other unmanned vehicles to carry out. For example, if another unmanned vehicle in the area currently carries the selected soil treatment, the task may be handed off to that unmanned vehicle.

In step 270, the system adjusts the deployment of sensor modules. In some embodiments, the system may be configured to select one or more additional sensor modules to deploy based on sensor data collected by the one or more sensor modules. For example, a general purpose chemical sensor may detect the presence of a type of chemical in the soil, and the system may select additional specialized sensor modules to deploy to identify the chemical and/or determine its concentration. In some embodiments, the system may be configured to select one or more new sensor module deployment locations based on sensor data collected by one or more sensor modules. In some embodiments, the system may be configured to detect a source location of the alert condition based on sensor data collected by the one or more sensor modules. For example, if the presence of a harmful chemical is detected in the soil, the system may be configured to move the sensor modules and/or add additional sensor modules near the location where a higher concentration of the chemical is detected. In some embodiments, sensor modules may be rearranged and/or concentrated several times until the system can pinpoint a location of highest chemical concentration, corresponding to the source of the chemical spill. After step 270, the process may return to 240 to deploy the sensor modules. In some embodiments, if the system determines that sufficient data has been collected at the deployed locations, the system may cause an unmanned vehicle to travel to the sensor module(s) and retrieve the modules. In some embodiments, one or more sensor modules may comprise biodegradable material may be left at the deployment location after measurements are complete. In some embodiments, the system may further be configured to determine one or more remedial tasks for the monitored area based on the collected sensor module data.

Figure 3:
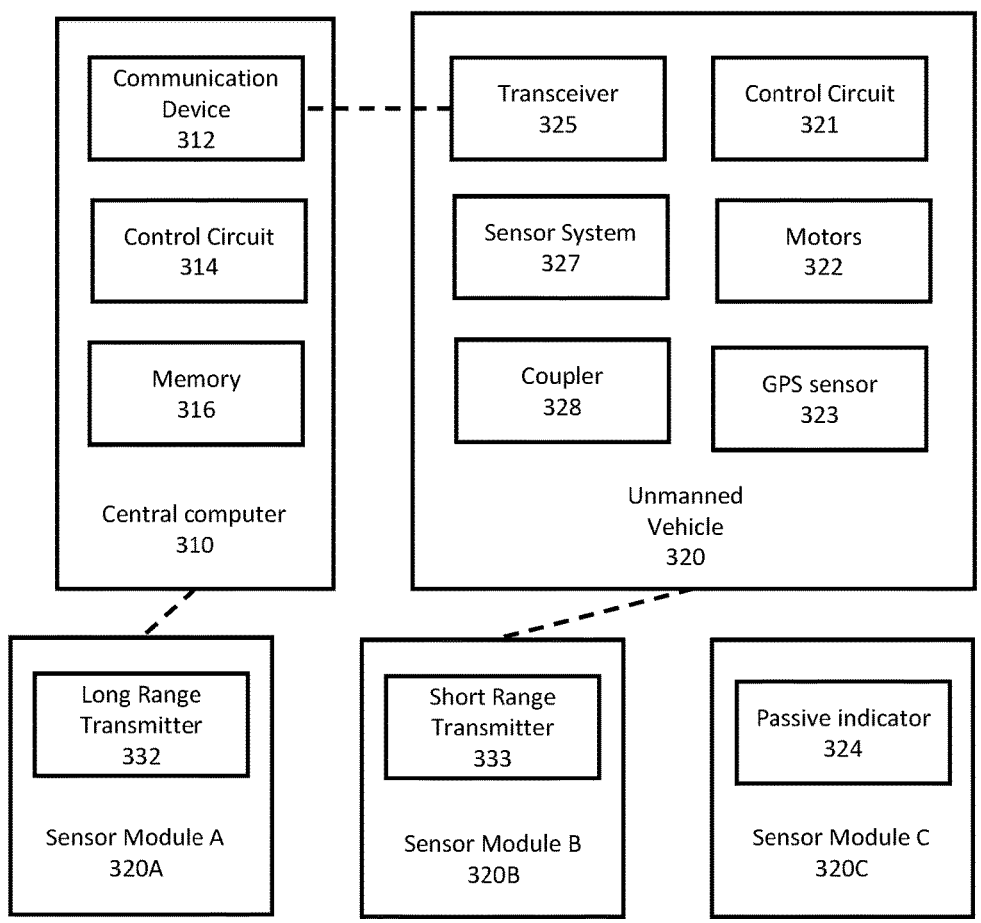
FIG. 3 is a block diagram of a system in accordance with several embodiments.

Referring now to FIG. 3, a block diagram of a system for field monitoring is shown. The system includes a central computer system 310, an unmanned vehicle 320, sensor module A 320A, sensor module B 320B, and sensor module C 320C.

The central computer system 310 comprises a communication device 312, a control circuit 314, and a memory 316. The central computer system 310 may comprise one or more of a server, a central computing system, an unmanned vehicle management computer system, and the like. In some embodiments, the central computer system 310 described herein may be implemented on the control circuits of one or more unmanned vehicles. In some embodiments, the central computer system 310 may comprise the central computer system 110 described with reference to FIG. 1 or a similar device. In some embodiments, the central computer system 310 may comprise a system of two or more processor-based devices. The control circuit 314 may comprise a processor, a microprocessor, and the like and may be configured to execute computer readable instructions stored on a computer readable storage memory 316. The computer readable storage memory 316 may comprise volatile and/or non-volatile memory and have stored upon it a set of computer readable instructions which, when executed by the control circuit 314, cause the system to manage tasks carried out by unmanned vehicles 320. In some embodiments, the control circuit 314 may further be configured to select sensor modules to deploy. In some embodiments, the computer executable instructions may cause the control circuit 314 of the central computer system 310 to perform one or more steps described with reference to FIG. 2 herein.

In some embodiments, the central computer system 310 may further be coupled to or include a sensor module database and/or an unmanned vehicle database configured to record statuses of sensor modules and unmanned vehicles managed by the central computer system 310 respectively. States of sensor modules may comprise one or more of each module's capability, sensor type, associated alert conditions, location, weight, availability, etc. In some embodiments, the system may be configured to use the sensor module database to match available sensor modules with detected alert conditions. States of unmanned vehicles may comprise one or more of each unmanned vehicle's type, location, assigned task(s), motor state, wing position, sensor reading, current attachments, capabilities, and/or fuel level. In some embodiments, the central computer system 310 may use the unmanned vehicle database to assign new tasks, provide task instructions to unmanned vehicles, and coordinate a system of unmanned vehicles at a monitored area.

The unmanned vehicle 320 may comprise an unmanned vehicle configured to travel in a field to perform a variety of tasks. In some embodiments, the unmanned vehicle 320 may comprise a UAV configured to fly at or near a target location and/or object. For example, the unmanned vehicle 320 may comprise a bicopter, a tricopter, a quadcopter, or hexacopter, octocopter, etc. In some embodiments, the unmanned vehicle 320 may comprise an air chamber (e.g. balloon, blimp, etc.) storing lighter than air gas for providing lift to the unmanned vehicle 320. In some embodiments, the unmanned vehicle 320 may comprise the unmanned aerial vehicle 125 described with reference to FIG. 1 or a similar device. In some embodiments, the unmanned vehicle may comprise a UGV configured to travel in the target location. In some embodiments, the UGV may comprise one or more wheels and/or other types of locomotion system for traveling on the ground. In some embodiments, the unmanned vehicle 320 may comprise the unmanned ground vehicle 127 described with reference to FIG. 1 or a similar device. The unmanned vehicle 320 comprises a control circuit 321, motor system 322, a GPS sensor 323, a transceiver 325, a sensor system 327, and a coupler 328.

The control circuit 321 may comprise one or more of a processor, a microprocessor, a microcontroller, and the like. The control circuit 321 may be communicatively coupled to one or more of the motor system 322, the GPS sensor 323, the transceiver 325, the sensor system 327, and the coupler 328. Generally, the control circuit 321 may be configured to navigate the unmanned vehicle 320 and cause the unmanned vehicle 320 to perform tasks. In some embodiments, the control circuit 321 may be configured determine alert condition and/or select sensor modules to deploy based on data from an onboard sensor system 327. In some embodiments, the control circuit 321 may be configured to navigate the unmanned vehicle 320 and deploy sensor modules based on instructions received from the central computer system 310. In some embodiments, the control circuit 321 may be configured to perform one or more steps described with reference to FIG. 2 herein.

The motor system 322 may comprise one or more motors that control one or more of a speed, direction, and/or orientation of one or more propellers and/or wheels on the unmanned vehicle 320. The motor system 322 may be configured to be controlled by the control circuit 321 to steer the unmanned vehicle 320 in designated directions. In some embodiments, the motor system 322 may be configured to pivot and/or rotate relative to the body of the unmanned vehicle 320 to provide propulsion in different directions. The GPS sensor 323 may be configured to provide GPS coordinates to the control circuit 321 for navigation. In some embodiments, the unmanned vehicle 320 may further include an altimeter for providing altitude information to the control circuit 321 for navigation.

The transceiver 325 may comprise one or more of a mobile data network transceiver, a satellite network transceiver, a WiMax transceiver, a Wi-Fi transceiver, a Bluetooth transceiver, a RFID reader, and the like. In some embodiments, the transceiver 325 may be configured to allow the control circuit 321 to communicate with the central computer system 310, another unmanned vehicle, a docking station, and/or a deployed sensor device. In some embodiments, the transceiver 325 may maintain at least periodic communication with the central computer system 310 while the unmanned vehicle 320 travels and performs tasks. In some embodiments, the unmanned vehicle 320 may be configured to autonomously travel and perform tasks for extended periods of time without communicating with a remote system.

The sensor system 327 may comprise one or more navigation and/or data collection sensors. In some embodiments, the sensor system 327 may comprise one or more sensors for capturing data around the unmanned vehicle 320. In some embodiments, the sensor system 327 may comprise one or more environmental sensors such as a wind sensor, a light sensor, an optical sensor, a visibility sensor, a weather sensor, a barometric pressure sensor, a range sensor, a humidity sensor, a sound sensor, a thermal image sensor, a night vision camera, a soil sensor, etc. In some embodiments, the sensor system 327 may be configured to collect data specified by one or more tasks assigned to the unmanned vehicle 320. In some embodiments, the sensor system 327 may include other navigation sensors such as optical sensors and radars for detecting obstacles in the path of travel to avoid collisions. In some embodiments, the sensor system 327 may comprise one or more detachable modular components comprising one or more sensors. In some embodiments, a sensor module may be configured to collect data while attached and/or detached from an unmanned vehicle. In some embodiments, the sensor system 327 may comprise one or more devices attached to the unmanned vehicle's body through one or more attachment means such as the coupler 328 and/or may be integrated with the body of the unmanned vehicle 320. In some embodiments, the data collected by the sensor system 327 may be used by the central computer system 310 and/or the unmanned vehicle 320 to detect for alert conditions and/or select sensor modules to deploy in the monitored area.

The coupler 328 may comprise a coupling mechanism for holding one or more sensor modules during transport. In some embodiments, the coupler 328 may comprise a mechanical and/or magnetic coupling mechanism configured to be activated by the control circuit 321. In some embodiments, the coupling mechanism may comprise a clamp, a latch, a mechanical arm, a dispenser, an aerial crane, a magnet, and the like. In some embodiments, the coupling mechanism may be configured to propel a sensor module away from the unmanned vehicle for deployment. In some embodiments, the coupling 328 and/or another device may be configured to secure the sensor module to a surface at the deployment location. In some embodiments, the coupler 328 and/or another device on the unmanned vehicle may further be configured to retrieve a previously deployed sensor. In some embodiments, the unmanned vehicle 320 may further comprise a power source such as a rechargeable battery, a replaceable battery, a fuel cell, a fuel tank, solar cells, etc.

The sensor modules 330A-C comprise sensors modules configured to be deployed in the field by the unmanned vehicle 320. In some embodiments, the sensor modules 330 A-C may comprise sensor modules 130-133 described with reference to FIG. 1 or other similar devices. In some embodiments, the sensor modules in the system may comprise a plurality of types of sensors such as one or more of an optical sensor, a camera, a soil sensor, a sonic detector, a wind sensor, a moisture sensor, a temperature sensor, a chemical detector, an airborne chemical sensor, a pollen sensor, a passive sensor, a color-changing sensor, a radon sensor, a lead sensor, a bacteria sensor, a pollen counter, a biodegradable sensor, a litmus paper, etc. In some embodiments, a sensor module may comprise a coupler for coupling to an unmanned vehicle. In some embodiments, a sensor module may comprise an anchor for anchoring to a deployed location such as one or more of the ground, a plant, a tree, a building, a structure, a container, and a vehicle. In some embodiments, a sensor module may be configured to communicate directly with unmanned vehicles and/or with a communication station in the field via a wireless communication device such as a short range transmitter 333. In some embodiments, the short range transmitter 333 may comprise one or more of a Bluetooth transceiver, a Wi-Fi transceiver, a radio frequency identification transmitter, an infrared transmitter, an optical transmitter, and the like. In some embodiments, a sensor module may be configured to transmit sensor reading to an unmanned vehicle, a communication station, and/or the central computer system 310 via a wireless communication device such as the long range transmitter 332. In some embodiments, a long range transmitter 332 may comprise one or more of a mobile data network transceiver, a satellite network transceiver, a WiMax transceiver, and the like. In some embodiments, the sensor module may comprise a passive sensor comprising an indicator such as the passive indicator 324 that may be detected by the unmanned vehicle. For example, the sensor module may comprise a color changing indicator that responses to environmental conditions such as temperature, moisture, airborne chemical, soil pH, etc. and an unmanned vehicle may collect the sensor data by capturing images of the sensor module 330C. In some embodiments, a sensor module may further comprise a power source such as one or more of a battery and a solar cell.

While only one unmanned vehicle 320 is shown in FIG. 3, in some embodiments, the central computer system 310 may communicate with and/or control a plurality of unmanned vehicles. In some embodiments, the central computer system 310 may coordinate the task performances of two or more unmanned vehicles deployed to the same task site. For example, two or more unmanned vehicles may collect data from different angles and locations to detect for alert conditions. In some embodiments, two or more unmanned vehicles may be sent out to deploy sensor modules to form a sensor array. In some embodiments, different unmanned vehicles may be instructed to collect onboard sensor data, deploy sensor modules, collect data from deployed sensor modules, and/or retrieve sensor modules. In some embodiments, the central computer system may be at least partially implemented on the control units of one or more unmanned vehicles, communication stations, docking stations, and sensor modules in the monitored area.

Figure 4:
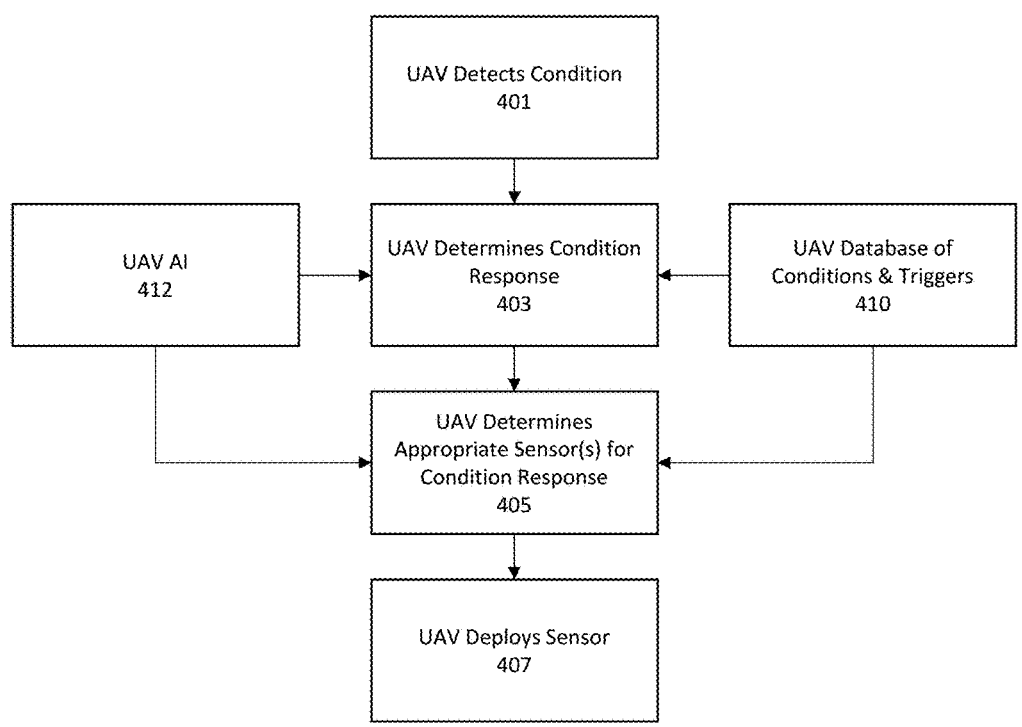
FIG. 4 is a flow diagram of a method in accordance with several embodiments.

Next referring to FIG. 4, a flow diagram for soil monitoring is shown. In step 401, the UAV detects ground conditions using onboard sensors. In some embodiments, ground conditions may be detected via optical sensors, cameras, thermal sensors, etc. In some embodiments, the soil conditions detected in step 401 may comprise information collected from a distance while the UAV is in flight. In some embodiments, step 401 may comprise comparing captured images with historical/expected conditions to detect for plant color changes, plant density changes, soil color changes, etc.

In step 403, the UAV determines a condition response based on the detected condition. In some embodiments, the condition response may be determined based on a UAV database of conditions and triggers 410 and artificial intelligence (AI) 412 on board the UAV. In some embodiments, the UAV database of conditions and triggers comprises tables corresponding detected conditions to responses. For example, the table may correspond the colors/images of plants to water deficiency, nutrient deficiency, chemical containment, pest damage, etc. In step 405, the UAV determines appropriate sensors for condition response. In some embodiments, the UAV database of conditions and triggers 410 may comprise selected sensors for each condition response determined by the system. For example, the table may correspond water deficiency, nutrient deficiency, chemical containment, and pest damage to moisture sensor, nutrient sensor, chemical sensor, and pest sensor respectively. In some embodiments, the sensors may be selected from available sensors on the UAV and/or stored at a nearby facility. In step 407, the UAV deploys the sensor(s). In some embodiments, the UAV may drop the sensor while in flight. In some embodiments, the UAV may land to position the sensor. In some embodiments, after step 407, the process may return to step 401 and the UAV may select different sensors and/or reposition deployed sensors in response to collected data and/or changes in the detected condition.

Figure 5:
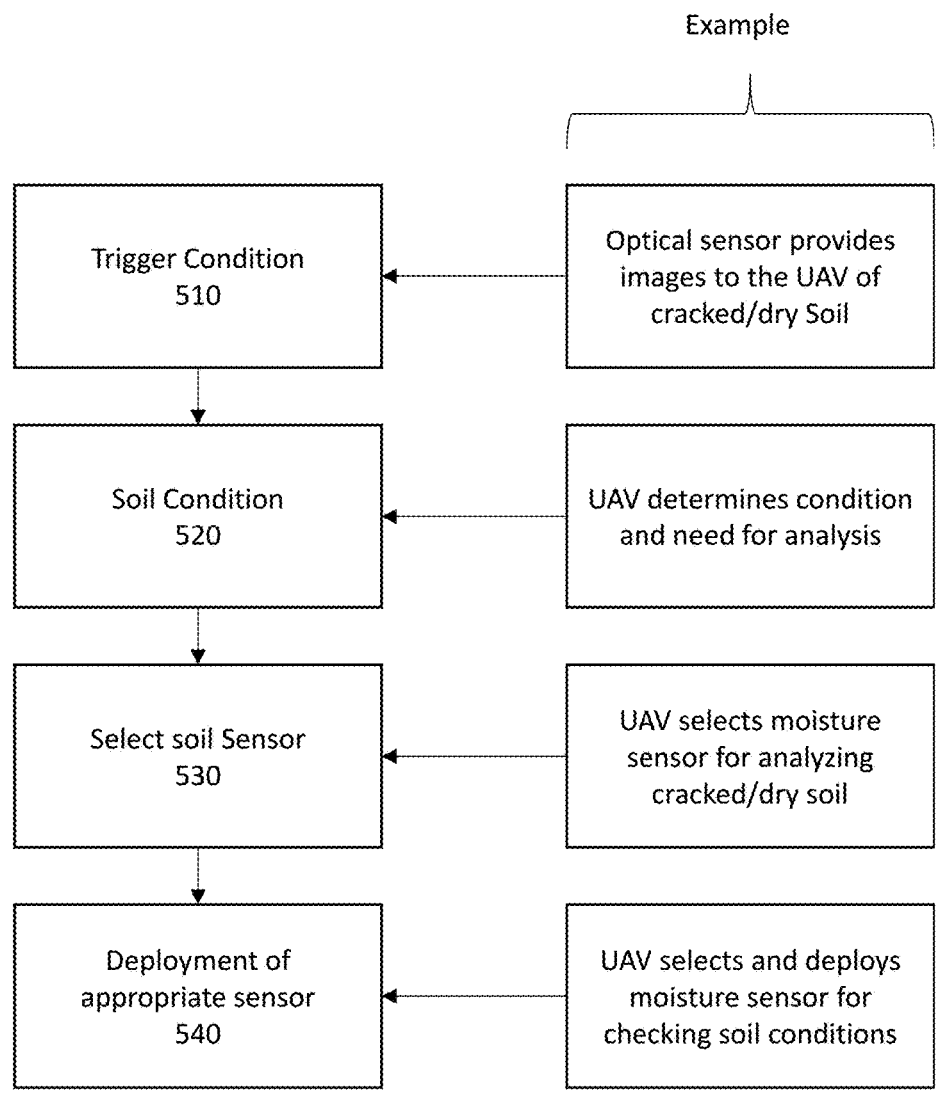
FIG. 5 is a flow diagram of a method in accordance with several embodiments.

Next referring to FIG. 5, a flow diagram for soil monitoring is shown. In step 510, the system detects a trigger condition. For example, a trigger condition may comprise a UAV's optical sensor capturing cracked or dry soil. In step 520, the system determines the soil condition. For example, the UAV may determine that the condition requires further analysis. In step 530, the system selects one or more soil sensors. For example, the UAV may select a moisture sensor for analyzing cracked or dry soil. In step 540, the system deploys the selected sensor(s). For example, the UAV may select and deploy moisture sensor in the field to monitor soil condition in response to detecting cracked or dry soil. In some embodiments, the UAV may further determine deployment locations of one or more sensors based on the detected condition.

In some embodiments, the system provides unmanned vehicles with retractable soil monitor and/or other types of sensors. In some embodiments, the sensor modules may be used to collect data while attached to an unmanned vehicle. In some embodiments, the sensor modules may be configured to be separate from the unmanned vehicle and shot into the soil. In some embodiments, the sensor modules may be configured to monitor a tornado, marine conditions, and water flows.

Non-limiting examples of tasks that may be carried out by UAVs and functionalities of UAVs are provided herein. In some embodiments, a UAV may be configured to dock with one or more of a field equipment, an autonomous vehicle, a stationary docking station, and a moving vehicle or equipment. In some embodiments, the system may use the parameters of a task to determine whether to perform the task while stationary, docked, moving, and/or undocked. In some embodiments, a task profile may specify an accuracy of the task and the system may determine whether the accuracy could be achieved while the UAV is docked or undocked. In some embodiments, the system may consider the optimization of one or more of the UAV, field equipment, and sensors in completing a task. In some embodiments, the system may consider the window of opportunity for performing the task. For example, a UAV assigned to perform night scouting may require the UAV to fly in a scouting pattern during a set period of time. In some embodiments, the system may consider whether to station the UAV based on energy efficiency. For example, the system may consider whether there is equipment in the field that can carry the UAV around while the UAV performs the assigned task. In some embodiments, the system may assess the risk that the task presents to the UAV, equipment, or persons in the field. For example, in high winds or high rains, the system may cause the UAV to dock at a station and complete the tasks from a fixed location. In some embodiments, the risks associated with given tasks and environment may be weighted heavily in the consideration as compared to other parameters and requirements.

In some embodiments, the decision making for the UAV may be logic dynamic and localized. For example, a UAV may be configured to make decisions in the field with logical values already defined. In some embodiments, UAVs may further be configured to assign tasks to field equipment. In some embodiments, UAVs may be configured to make decisions based on their existing missions and data received from sensors and/or a remote data source.

In some embodiments, a decision-making system may use tasks assigned to a UAV, including rules and parameters, to determine whether to dock, undock, or fly the UAV. In some embodiments, the system may consider sensor data, required equipment, task criterion, fuel level, system optimization, equipment optimization, task optimization, and field optimization in the decision making. In some embodiments, a UAV may be configured to mission plan and making changes to equipment's missions while it is docked.

In some embodiments, a UAV may be configured to use the docking station for data processing, data storage, communication with equipment, refueling, retooling, etc. In some embodiments, a UAV may use the docking station to process the data received from its own sensors and/or the sensors on other equipment. In some embodiments, a UAV may be configured to use the docking station to store the data. In some embodiments, a UAV may be configured to use the docking station to communicate with other equipment in the field, a central computer system, and/or one or more persons operating or working with the system. In some embodiments, a UAV may use the docking station to retool its integrated devices, such as removing/adding modular adapters for various sensors. In some embodiments, sensors may include soil monitors, weather monitors, pest monitors, etc. In some embodiments, the system may comprise modular sensors configured to be dropped from the UAV, and monitor the given area via ongoing active communication, and then picked up by the UAV. In some embodiments, a UAV may replenish its power source at the docking station through one or more of electromagnetic induction, automated battery swapping, plug-and-play recharging, radio frequency induction, etc.

In some embodiments, a UAV may be configured perform a variety of tasks while landed. In some embodiments, a UAV may be configured to collect information and data from a onboard sensor, remote sensors, and other equipment. In some embodiments, a UAV may be configured to exchange data with a docking station. In some embodiments, a UAV may perform visual analysis using its own visual system or other equipment. In some embodiments, a UAV may process data using an onboard data processors and/or a data processor of the docking stations.

In some embodiments, if a UAV is docked on a given piece of equipment, the UAV may be configured to function as a diagnostic tool for the equipment. In some embodiments, a UAV may transmit equipment errors to a central computer system, an operator, a docking station, or other equipment. In some embodiments, a UAV may be configured to perform repair service on the equipment based on the detected errors.

In some embodiments, a system tracks and manages the seed to sale process of fresh produce. The process may start from seed, to growth, to harvest, to long distance transport, to last-mile transport, to point of sale, including storage points along the way ranging from bulk stores and store shelves. Efficient management of such process may get fresh produce to a buyer at a point of sale with ample return from investment and increase customer satisfaction. In some embodiments, the system may be configured to use UAVs and other sensor data for risk reduction. In some cases, the greatest risk of investment corresponds to when a farmer plants a seed and the least risk occurs at the point of sale when a customer has the fresh produce in hand. In some embodiments, UAV data may be analyzed along with other data to reduce the risk. For example, a UAV may be used to determine optimal planting conditions weighed against the optimal window for planting in the region—a period of high uncertainty. In another example, a UAV may be used to determine optimal harvest times weighed against near-term weather—a period of lower uncertainty. In some embodiments, data used for system management may be repurposed in the futures markets to further offset risks.

In some embodiments, reducing risks at different stages of the seed to sale process allows algorithms to give freshness-at-an-ample-margin a higher priority than simple efficient logistics. Having a higher percentage of produce successfully grown reach customers can offset the marginally higher cost of implementing the system. The costs may further be reduced by the higher number of satisfied customers that return to their point of sale. Transport and storage cost may also be calculated to increase the efficiency of the system.

With the system, the risk of loss from seed to sale may track downward as each hurdle (risk generating event) is successfully crossed. In some embodiments, UAV data may be used to flag whenever the risk tracks the wrong way. For example, oversupply that could lead to produce spoilage could be offset by an adjustment elsewhere in the system. In another example, the system may detect that a region needs more transport capacity to move the expected volume of harvest faster. In some embodiments, with the system, UAV or other sensors may make the system more efficient. Additionally, uncertainties may be identified and/or reduced to increase the odds of successfully going from seed to sale and gaining a satisfied customer that returns for purchases.

In some embodiments, a UAV may be configured to perform cross-purpose transport. For example, the system may anticipate needs such as fertilizers, and optimize the use of the UAV's transport capacity both ways. In some embodiments, the docking stations may comprise solar panel with autonomous UAV hookup on rooftops for near-autonomous off-the-grid functioning of UAVs. In some embodiments, a docking station may include retractable cover for sheltering UAVs from the weather. In some embodiments, a UAV and/or a docking station may comprise an autonomous system status checker that updates when asked or when a problem is detected.

In some embodiments, a UAV may be configured to leapfrog docking station chains to increase the coverage area of a single UAV. In some embodiments, the system may include rescue UAVs configured to recover other malfunctioned UAVs. In some embodiments, a UAV may comprise retractable "hawk wings" to leverage wind or thermals energy from fields for extended flying time and/or to leverage the wind for more efficient flight.

In some embodiments, a UAV may function as a "scarecrow" by producing animal deterring sounds. In some embodiments, a UAV may be configured to chasing birds away from the field. In some embodiments, a UAV may be configured to scare birds or repel insects using compressed air (via noise or air-pressure). In some embodiments, a UAV may be configured to recognize birds visually and take action to deter birds accordingly. In some embodiments, a UAV may be shaped like a hawk to scare away birds. In some embodiments, a UAV may comprise a sensor (e.g. radar) to detect birds approaching from a distance. In some embodiments, one or more UAVs may be configured to herd animals away from crops.

In some embodiments, a UAV may be configured to function as a targeted pollinator. In some embodiments, a UAV may comprise a precise automated navigation system, a mapping sensor, altitude control, and a pollen dispenser. In some embodiments, the pollen dispenser may use inkjet technology for dispensing pollen. In some embodiments, a UAV may drag a refillable pad or a light weight brush across flowers to aid in pollination. In some embodiments, the UAV may comprise a squirt gun configured to perform binding application targeted at flowers. In some embodiments, the UAV may be configured to automatically refill the pollen application. In some embodiments, a UAV may be configured to carry a tank of pollen on the UAV to supply the dispenser. In some embodiments, the pollen application may comprise indicators to identify whether a flower has been pollinated. For example, the indicators may be read similar to a radar scan and detected as hot spots. In some embodiments, pollen application may be detected based on visual analytics. In some embodiments, a combination of pollen and an agent (e.g. dye, chip) may be used to identify if the pollen has reached the flowers. In some embodiments, a UAV may comprise a sky-crane to lower the pollinator device(s) and may hover above the plants and not downwash on flowers. In some embodiments, the UAVs may comprise lighter than air hybrid UAV for stationary or slow moving operations such as 24/7 monitoring. In some embodiments, a UAV may be configured to perform post pollination quality checks based on image analysis. In some embodiments, the system may optimize the timing of pollination to avoid other sources of pollen and cross contamination.

In some embodiments, a UAV may comprise a precision insecticide dispenser. In some embodiments, a UAV may be call in when insects are detected in a field or in adjacent fields before they arrive in the home field. In some embodiments, the system may increase the efficiency and reduce the cost large scale organic farming. In some embodiments, the system may also reduce the effects of pesticides on the environment.

In some embodiments, the system may comprise air analyzers for detecting the presence of insects and/or pest animals (e.g. ground hog) based on bug expiration and/or odor of droppings. In some embodiments, a solar panel docking stations may create a perimeter around the farms to monitor the entire field as well as the air above it. In some embodiments, UAVs and other devices may function as a surrogate for the fence line and use a wireless connection (e.g. Wi-Fi) for sharing information. In some embodiments, the system may be configured to detect and identify pest profiles on leaves, stalks, etc. In some embodiments, the system may use audio data to identify pests.

In some embodiments, a solar panel may be added to an airship type UAVs for constant refueling and multi-use/purpose. In some embodiments, a UAV, a docking station, and/or a solar panel of the docking station may comprise a bug zapper curtain and/or may target pests on the fly. In some embodiments, a UAV, a docking station, and/or a solar panel may comprise an attractive agent to herd bugs and eliminate pests. In some embodiments, bodies of dead pests may be used for food for livestock and/or fertilizer.

In some embodiments, UAVs may comprise wings for gliding. In some embodiments, UAVs may comprise solar panels for longer flight time. In some embodiments, the system may comprise modularized sensor units configured to be attached to different types of vehicles. In some embodiments, sensor units may be removable from UAVs to reduce the weight of the UAV. In some embodiments, UAVs may be configured to have modules autonomously attached, removed, and/or reconfigured at a tooling station. In some embodiments, UAVs may comprise modularized receptor for various sensor configurations. In some embodiments, a UAV may comprise a retractable soil, weather, or water monitoring device. In some embodiments, a monitoring device may be attached to the UAV or may be configured to be shot into the soil and separated from the UAV.

In some embodiments, UAVs may be configured to handle some monitoring functions that do not require flight (e.g. weather monitoring) from the ground and/or a docking station. In some embodiments, UAVs may be configured to simultaneously monitor an area and gather of data in parallel. In some embodiments, soil, weather, and other types of conditions may be monitored at the same time. In some embodiments, a UAV and/or a docking station may perform topographical analysis to provide an accurate starting point for the delta. In some embodiments, a UAV may be configured to detect if a specific portion of an agricultural plot needs to be harvested. In some embodiments, a UAV may be used to slow the progression of a part of a plot. In some embodiments, field information may be relayed back to a central computer system and/or an operator, and farm vehicles may be directed to the location for harvesting.

In some embodiments, UAVs, whether stationed or in flight, may function as waypoints for other vehicles. In some embodiments, the system may comprise fixed nodes in the fields that can act as monitors and also relay information (e.g. location assistance) to the UAVs and other types of equipment. In some embodiments, UAVs may function as scouts in assisting workers who are harvesting or planting. In some embodiments, a UAV may be configured to detect weeds in a plot based on image analysis. In some embodiments, a UAV may be configured to dock with and/or undock from a tractor moving in the field.

In some embodiments, the system may be configured to optimize flight patterns by time and altitude for different monitoring functions. In some embodiments, a UAV may comprise retractable sails to optimize efficiency in vertical wind conditions.

In some embodiments, the system may perform bird identification and adjust its abilities based on those identifications. In some embodiments, animals may be identified based on trackers. In some embodiments, a UAV may be configured to remove the animal or pest from the field. In some embodiments, a UAV may use radar or detect for pests. In some embodiments, a UAV may proactively deter pests and/or use of weaponized devices (e.g. nets, pesticide, sprayer, cartage system, etc.) to combat pests and animals. In some embodiments, UAVs may be configured to herd and/or shepherd animals. In some embodiments, a UAV may be configured to interact with dogs and/or workers to assist in herding.

In some embodiments, a UAV may employ military-style silence technology to reduce the noise made by the UAV and allows for night UAV operations. In some embodiments, UAVs may be configured to produce audio or digital signal to notify customers of its arrival. In some embodiments, UAVs may function as before-the-first responder UAV in energy situations delivering such items as defibrillators and instructions when time is supercritical. In some embodiments, a UAV may provide first responders with an early video of the scene before responders arrive. In some embodiments, such UAVs may be pre-positioned well forward of first responder bases to respond to emergency situations.

In some embodiments, a functioning UAV that is somehow cut off between delivery and retrieval may be configured to hover at a fixed location and a fixed altitude (e.g. 7 feet) until retrieved. In some embodiments, a UAV may be equipped with dog deterring whistle. In some embodiments, UAVs may be configured to transport cross-inventory exchange between stores. In some embodiments, UAVs may comprise detachable rotors and motors that can be easily replaced in the field. In some embodiments, the system may send a verification ping to a smartphone to ensure someone is standing by for a delivery before a delivery UAV is launched.

In some embodiments, UAVs may use highways as path guidance as almost all delivery locations would have access to roads, people are used to items on roads making noise, roads a generally clear of obstacles spare some tunnels and city underpasses, and roads provides a unique fingerprint to find locations.

In some embodiments, UAVs may function as predator-deterring sentry units. In some embodiments, UAVs may tracks emitters from government collared predators (e.g. wolves and mountain lions) in national and state parks near farmland areas. In some embodiments, UAVs may be configured to UAV chases off predators that come too close using high-frequency whistles to reduce conflicts between farmer and predator animals. In some embodiments, UAVs may be configured to shepherd farm animals.

In some embodiments, UAVs may be configured for loss prevention in stores. In some embodiments, one or more UAVs may be hangs from above a store entryway. If a shoplifter leaves the store with a security-detected item, the UAV may drops from the roof and follow the shoplifter from about twelve feet up, flashing lights and taking video. In some embodiments, a customer may receive a warning that they are carrying a security-detected item before they step out the door.

In some embodiments, UAVs may be configured to escort customers out to their vehicle with lights and/or video recording. In some embodiments, the functions the system may be integrated into a shopping cart and/or a personal assistance device.

In some embodiments, UAVs may be configured to drop items (e.g. packages, sensors) via parachutes. In some embodiments, UAVs may be used to deploy fertilizers, determine yields for farmers, and forecast harvest to anticipate the needs for transport and provide accurate sourcing to different facilities within the supply chain to minimalize the discounting of produce and increase even distribution of products In some embodiments, the system may comprise solar panel docking stations throughout a field so UAVs can charge while surveilling the field. In some embodiments, docking stations may comprise sensors for detecting one or more of moisture, sunlight, rainfall, temperature, etc.

In some embodiments, UAVs may be configured to deploy supplies to farmers in the field. In some embodiments, UAVs may be used to survey potential crop plots and analyze the ground beneath to increase crop plot usage efficiency. In some embodiments, UAVs may be configured to monitor and record human activity in the field. In some embodiments, UAVs may include visual analytic sensors configured to detect abnormal activity in the field from one or more of humans, pets, and animals. In some embodiments, UAVs may be configured to deploy water. In some embodiments, UAVs may be configured to follow farm workers during harvesting to optimize harvest/plant route planning. In some embodiments, UAVs may transmit a route plan to workers that analyzes the worker's position and the harvest/plant route line to provide workers with an efficient crop harvesting and planting management plan.

In some embodiments, when a UAV loses connection or fails while operating, the UAV may deploy a parachute for landing. In some embodiments, a UAV parachute may be configured pulled back into the parachute housing at the top of the UAV. In some embodiments, the parachute may wrap around the UAV, including the propellers, and remain tight with tension by gear or other mechanism. In some embodiments, a failed UAV may transmit a homing beacon to a central computer or a docking station and sit wrapped and secured until help arrives.

In some embodiments, UAVs may be configured to track marine wildlife. In some embodiments, sizes, paths, and locations of marine wildlife may be tracked with UAVs. Information of marine life sighting may be relayed to officials in near real time. In some embodiments, UAVs may be configured to shoot RFID chips from the air and tag wildlife. In some embodiments, UAVs may further monitor shorelines and boating paths. In some embodiments, UAVs may also detect for swimmers in distress. In some embodiments, UAVs may include flexible wings that may adjust to wind streams, much like sailboats. In some embodiments, UAVs may further monitors for drug trafficking, perform search and rescue, and/or provide lifeguard services. In some embodiments, a UAV may be configured to deploy a parachute and/or a raft when it fails over water or land to reduce the damage sustained from impact.

In some embodiments, UAVs may be used to track containers waiting for customs processing in a port area to detect for congestions at the port and get early formation for potential impacts on resources and supply chain. In some embodiments, UAVs may be used to conduct temperature management for the containers and/or monitor the cold chain/chilled chain.

In some embodiments, UAVs may be used to check that a fence around the property is not damaged. In some embodiments, UAVs may be used to check on the well-being of the animals, such as cattle, horses. In some embodiments, a UAV may be configured to detect that another UAV is deliberately attempting to fly into it and maneuver to avoid damage. In some embodiments, a UAV may be configured to time the application fertilizer to control the peak harvest time based on the expected peak price for the commodity.

In one embodiment, a system for field monitoring comprises a plurality of types of sensor modules, an unmanned vehicle comprising a sensor system, and a control circuit configured to: receive onboard sensor data from the sensor system of the unmanned vehicle, detect an alert condition at a monitored area based on the onboard sensor data, select one or more types of sensor modules from the plurality of types of sensor modules to deploy at the monitored area based on the onboard sensor data, and cause the unmanned vehicle and/or one or more other unmanned vehicles to transport one or more sensor modules of the one or more types of sensor modules to the monitored area and deploy the one or more sensor modules by detaching from the one or more sensor modules at the monitored area.

In one embodiment, a method for field monitoring comprising: receiving, at a control circuit, onboard sensor data from a sensor system of an unmanned vehicle, detecting, with the control circuit, an alert condition at a monitored area based on the onboard sensor data, selecting, with the control circuit, one or more types of sensor modules from a plurality of types of sensor modules to deploy at the monitored area based on the onboard sensor data, and causing the unmanned vehicle and/or one or more other unmanned vehicles to transport one or more sensor modules of the one or more types of sensor modules to the monitored area and deploy the one or more sensor modules by detaching from the one or more sensor modules at the monitored area.

In one embodiment, an apparatus for field monitoring, comprises a non-transitory storage medium storing a set of computer readable instructions and a control circuit configured to execute the set of computer readable instructions which causes to the control circuit to: receive onboard sensor data from a sensor system of an unmanned vehicle, detect an alert condition at a monitored area based on the onboard sensor data, select one or more types of sensor modules from a plurality of types of sensor modules to deploy at the monitored area based on the onboard sensor data, and cause the unmanned vehicle and/or one or more other unmanned vehicles to transport one or more sensor modules of the one or more types of sensor modules to the monitored area and deploy the one or more sensor modules by detaching from the one or more sensor modules at the monitored area.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for field monitoring with an unmanned vehicle system comprising:
   an unmanned vehicle comprising a sensor system;
   a plurality of types of sensor modules carried onboard the unmanned vehicle; and
   a control circuit configured to:
     receive onboard sensor data from the sensor system of the unmanned vehicle collected while the unmanned vehicle is traveling;
     detect an alert condition at a monitored area based on the onboard sensor data;
     select one or more sensor modules from the plurality of types of sensor modules carried onboard the unmanned vehicle to deploy at the monitored area based on the onboard sensor data, wherein the one or more sensor modules are selected based on matching the alert condition to capabilities of the one or more sensor modules among the plurality of types of sensor modules; and
     cause the unmanned vehicle to deploy the one or more sensor modules by detaching from the one or more sensor modules at the monitored area, wherein the one or more sensor modules are configured to remain in the monitored area to collect data over time.

2. The system of claim 1, wherein the control circuit comprise a control unit on the unmanned vehicle.

3. The system of claim 1, wherein the unmanned vehicle comprises an unmanned ground vehicle or an unmanned aerial vehicle.

4. The system of claim 1, wherein the unmanned vehicle is configured to retrieve one or more deployed sensor modules.

5. The system of claim 1, wherein the control circuit is further configured to determine deployment locations of the one or more sensor modules in the monitored area.

6. The system of claim 1, wherein the one or more sensor modules are deployed on one or more of: the ground, a plant, a tree, a building, a structure, a container, and a vehicle.

7. The system of claim 1, wherein the one or more sensor modules comprises one or more of: an optical sensor, a camera, a soil sensor, a sonic detector, a wind sensor, a moisture sensor, a temperature sensor, a chemical detector, an airborne chemical sensor, a pollen sensor, a passive sensor, a color-changing sensor, a radon sensor, a lead sensor, a bacteria sensor, a pollen counter, a biodegradable sensor, and a litmus paper.

8. The system of claim 1, wherein the control circuit is further configured to select one or more of additional sensor modules to deploy based on sensor data collected by the one or more sensor modules.

9. The system of claim 1, wherein the control circuit is further configured to select one or more new sensor module deployment locations based on sensor data collected by the one or more sensor modules.

10. The system of claim 1, wherein the control circuit is further configured to detect a source location of the alert condition based on sensor data collected by the one or more sensor modules.

11. A method for field monitoring with an unmanned vehicle system comprising:
    receiving, at a control circuit, onboard sensor data from a sensor system of an unmanned vehicle collected while the unmanned vehicle is traveling, wherein the unmanned vehicle carries a plurality of sensor modules;
    detecting, with the control circuit, an alert condition at a monitored area based on the onboard sensor data;
    selecting, with the control circuit, one or more sensor modules from a plurality of types of sensor modules carried onboard the unmanned vehicle to deploy at the monitored area based on the onboard sensor data, wherein the one or more sensor modules are selected based on matching the alert condition to capabilities of the one or more sensor modules among the plurality of types of sensor modules; and
    causing the unmanned vehicle to deploy the one or more sensor modules by detaching from the one or more sensor modules at the monitored area, wherein the one or more sensor modules are configured to remain in the monitored area to collect data over time.

12. The method of claim 11, wherein the control circuit comprise a control unit on the unmanned vehicle.

13. The method of claim 11, wherein the unmanned vehicle comprises an unmanned ground vehicle or an unmanned aerial vehicle.

14. The method of claim 11, wherein the unmanned vehicle is configured to retrieve one or more deployed sensor modules.

15. The method of claim 11, further comprising:
    determining deployment locations of the one or more sensor modules in the monitored area.

16. The method of claim 11, wherein the one or more sensor modules are deployed on one or more of: the ground, a plant, a tree, a building, a structure, a container, and a vehicle.

17. The method of claim 11, wherein the one or more sensor modules comprises one or more of: an optical sensor, a camera, a soil sensor, a sonic detector, a wind sensor, a moisture sensor, a temperature sensor, a chemical detector, an airborne chemical sensor, a pollen sensor, a passive sensor, a color-changing sensor, a radon sensor, a lead sensor, a bacteria sensor, a pollen counter, a biodegradable sensor, and a litmus paper.

18. The method of claim 11, further comprising:
   selecting one or more of additional sensor modules to deploy based on sensor data collected by the one or more sensor modules.

19. The method of claim 11, further comprising:
   selecting one or more of new sensor module deployment locations based on sensor data collected by the one or more sensor modules.

20. The method of claim 11, further comprising:
   detecting a source location of the alert condition based on sensor data collected by the one or more sensor modules.

21. An apparatus for field monitoring with an unmanned vehicle system, comprising:
   a non-transitory storage medium storing a set of computer readable instructions; and
   a control circuit configured to execute the set of computer readable instructions which causes to the control circuit to:
   receive onboard sensor data from a sensor system of an unmanned vehicle collected while the unmanned vehicle is traveling, wherein the unmanned vehicle carries a plurality of sensor modules;
   detect an alert condition at a monitored area based on the onboard sensor data;
   select one or more sensor modules from a plurality of types of sensor modules carried onboard the unmanned vehicle to deploy at the monitored area based on the onboard sensor data, wherein the one or more sensor modules are selected based on matching the alert condition to capabilities of the one or more sensor modules among the plurality of types of sensor modules; and
   cause the unmanned vehicle to deploy the one or more sensor modules by detaching from the one or more sensor modules at the monitored area, wherein the one or more sensor modules are configured to remain in the monitored area to collect data over time.

* * * * *